Patented Mar. 30, 1943

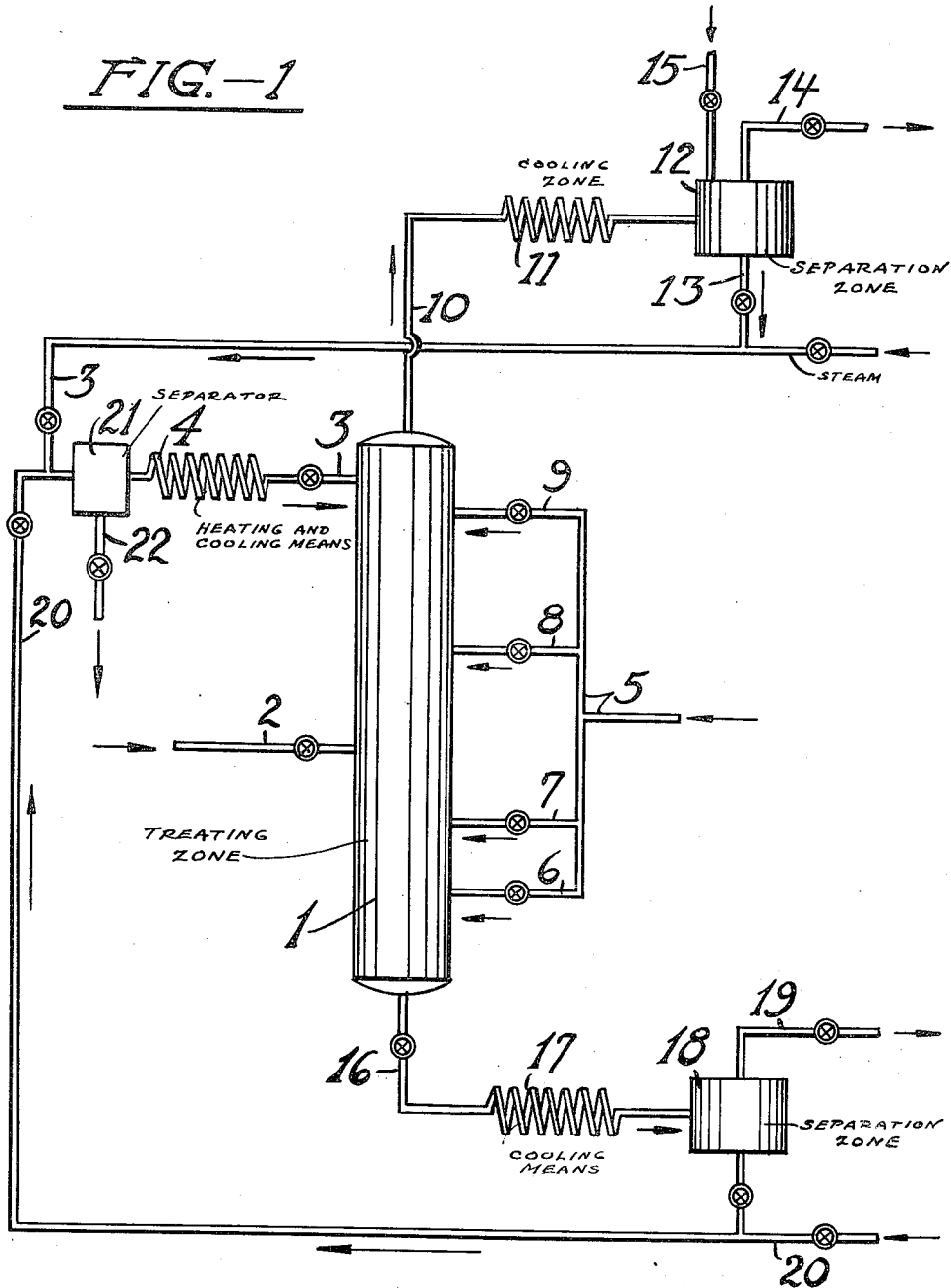

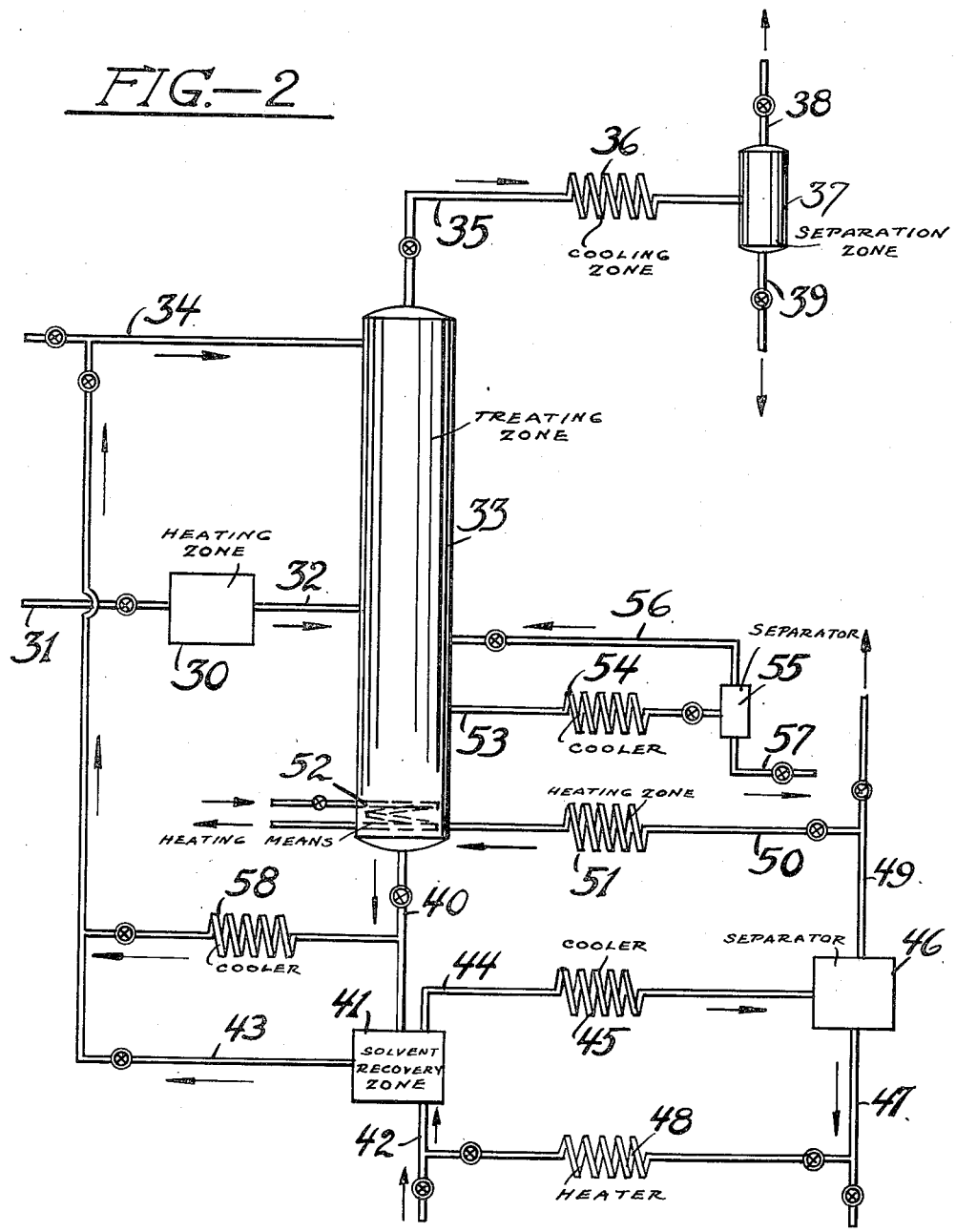

2,315,057

UNITED STATES PATENT OFFICE 2,315,057

SOLVENT TREATING PROCESS

August Holmes, Cranford, and Henry J. Hibshman, Plainfield, N. J., assignors to Standard Oil Development Company, a corporation of Delaware Application April 12, 1941, Serial No. 388,198

6 Claims. (Cl. 196—13)

The present invention is concerned with the refining of oils. The invention more particularly relates to a process for the segregation of oils, especially petroleum oils, into their relatively more aromatic and into their relatively more paraffinic constituents utilizing a solvent comprising sulfur. In accordance with the present process, a solvent comprising liquid sulfur is employed to extract hydrocarbon constituents selectively from mixtures containing the same.

It is known in the art to treat oils and the like with various solvents which have the ability to segregate these oils into their respective constituents as measured by a difference in chemical and physical properties. For example, it is known to treat petroleum oils with solvents or solvent mixtures selected from the class of solvents which have a preferential selectivity for the relatively more aromatic or hydrogen-poor constituents as compared to the relatively more paraffinic or hydrogen-rich constituents. Solvents of this class are, for example, phenol, furfural, sulfur dioxide, cresol, nitrobenzene, aniline, beta beta' dichlor diethyl ether, and the like. It is also known to use these solvents in combination with other substances, as for example, in combination with liquid normally gaseous hydrocarbons such as propane, ethane, and the like. Although a batch or semi-batch operation is entirely satisfactory, the usual practice is to contact the oil and solvent in a countercurrent tower treating process. In operations of this character the heavier phase, usually the solvent, is introduced into the top of a countercurrent treating tower, while the lighter phase, usually the oil, is introduced into the bottom of the tower. These phases flow in a countercurrent relationship. Efficient contact between the countercurrently flowing phases is usually secured by suitable contacting and distributing means. Conditions are so adjusted to form a solvent poor or raffinate phase, highly paraffinic in nature, and a solvent rich or extract phase, highly aromatic in nature. The respective phases are separated and the solvent is separated from the extract and raffinate respectively, usually by distillation.

The removal of the solvent from the raffinate and extract phases by distillation has not been entirely satisfactory since solvents which have desirable characteristics have relatively high specific and latent heats. Thus, solvent treating operations have been limited to some extent by the costs of the recovery of the selective solvent from the treating oil. In order to lower operation cost and to create a more widespread application of solvent treating operations, numerous proposals have been made in order to eliminate or modify the solvent recovery step. For example, it has been proposed to re-extract the solvent extract and raffinate phases with a secondary solvent having relatively low specific and latent heats which will have a preferential selectivity for the raffinate and extract respectively as compared to the primary solvent. This process, likewise, has not been entirely satisfactory since the known secondary solvents do not completely remove the last traces of the highly aromatic constituents from the primary solvent. Thus, the concentration of the highly aromatic constituents continuously builds up in the primary solvent, necessitating replacement of the same or purification by distillation and the like. Another method of separating the selective solvents from the oil is to add a precipitant to the solvent extract mixture which will precipitate the oil out of the solvent and to subsequently separate the solvent and precipitant. This operation has not had widespread application, since to obtain a fairly complete precipitation the amount of precipitant required is excessive.

We have now discovered a process utilizing a solvent which has a high selectivity for effecting a separation between respective hydrocarbon constituents and which may be efficiently and economically recovered from the respective phases. In accordance with our process, we employ a solvent comprising liquid sulfur in order to secure the desired separation of the feed constituents, or for the segregation of a particular constituent from a mixture containing the same. In accordance with the preferred modification of the invention, the respective phases are separated and removed from the reaction zone, cooled below a temperature at which the sulfur crystallizes, and the solvent thus readily removed from the raffinate and extract oil streams.

The process of our invention may be readily understood by reference to the drawings illustrating embodiments of the same. Figure 1 illustrates an operation in which a liquid-liquid process is employed, while Figure 2 illustrates an operation in which a liquid-vapor operation is employed. Referring specifically to Figure 1, for purposes of description, it is assumed that the feed oil comprises a petroleum oil and that the same is countercurrently contacted with a solvent comprising liquid sulfur. The feed oil is introduced into an intermediate point of countercurrent treating zone 1 by means of feed line 2. The oil flows upwardly in zone 1 and contacts downflowing liquid sulfur which is introduced into treating zone 1 by means of line 3. The desired temperature of the solvent is attained by means of heating or cooling means 4. Conditions in tower 1 are adapted to secure the formation of a solvent-poor or raffinate phase and a solvent-rich or extract phase. If desired, a precipitating liquid may be introduced into tower 1 at one or at a plurality of stages by means of lines 5, 6, 7, 8 and 9. The raffinate phase is withdrawn from tower 1 by means of line 10, passed through cooling zone 11, and introduced into separation zone 12. In this zone, the treated oil is removed from the precipitated sulfur which is withdrawn by means of line 13 while the treated oil is withdrawn by means of line 14 and further handled or disposed of as desired. Under certain conditions it may be desirable to introduce into separation zone 12 an additional quantity of the precipitating liquid by means of line 15. The sulfur solvent removed by means of line 13 is heated and recycled to the system by any suitable process. In accordance with our process, it is preferred to introduce a quantity of steam into the sulfur in order to liquefy the same prior to recycling the solvent to the treating zone. If this operation be employed, the mixture is passed to separator 21 wherein the water is removed by means of line 22.

Similarly, the solvent extract phase is withdrawn from treating zone 1 by means of line 16, cooled in cooling means 17 and passed into separation means 18 wherein a separation is made between the precipitated sulfur and the oil. The oil is withdrawn from separation means 18 by means of line 19 while the sulfur is recycled to the system. This is preferably secured by means of steam which is introduced by means of line 20. The water is separated from the liquid sulfur by passing the mixture through separator 21.

Referring specifically to Figure 2, it is assumed that the feed oil to be treated comprises a petroleum oil boiling in the range below about 600° F. The feed oil is introduced into heating zone 30 by means of line 31, withdrawn as a vapor by means of line 32, and introduced at an intermediate point in treating zone 33. The vapors flow upwardly through the upper section of treating zone 33 and countercurrently contact a downflowing solvent comprising liquid sulfur, which is introduced into the top of treating zone 33 by means of line 34. Temperature and pressure conditions are adjusted in treating zone 33 to secure the desired separation of the hydrocarbon constituents. The treated vapors are removed overhead from treating zone 33 by means of line 35, condensed in cooling zone 36, and introduced into separator 37 wherein uncondensed constituents are removed by means of line 38. The condensed distillate is removed from zone 37 by means of line 39 and handled and further refined in any manner desirable. The solvent comprising sulfur containing the dissolved hydrocarbon constituents flows downwardly through treating zone 33 and is withdrawn by means of line 40. The solvent is passed into solvent recovery zone 41 wherein the hydrocarbon is distilled with steam which is introduced by means of line 42. The solvent substantially completely free of dissolved hydrocarbon constituents is removed from recovery zone 41 by means of line 43 and recycled to treating zone 33. The steam along with the recovered hydrocarbons is removed from recovery zone 41 by means of line 44, condensed in cooler 45, and passed into separator 46 wherein a separation is made between the water and the recovered hydrocarbon constituents. The water is removed from separator 46 by means of line 47. The water may be vaporized in heater 48 and recycled to zone 41 if desired. The hydrocarbon constituents are removed from separator 46 by means of line 49 and further recycled and handled as desired. Under certain conditions it may be desirable to segregate a portion of the hydrocarbon constituents removed from zone 46 by means of line 50 to vaporize the same in heating zone 51 and to reintroduce the same into the bottom of treating zone 33.

A preferred adaptation of the present invention comprises supplying sufficient heat by means of heating means 52 to the bottom of treating zone 33 in a manner to vaporize the dissolved hydrocarbon constituents therefrom. If this operation be employed, the vaporized hydrocarbon constituents are withdrawn from treating zone 33 by means of line 53, condensed in cooler 54, and passed into separator 55 wherein a separation is made between uncondensed hydrocarbon constituents and the condensate. The uncondensed hydrocarbon constituents are returned to treating zone 33 by means of line 56 while the condensed product is withdrawn by means of line 57 handled as desired. If this operation be employed, the solvent comprising sulfur is withdrawn from the bottom of treating zone 33, passed through cooler 58, cooled to the desired extent, and recycled to the top of treating zone 33.

The process of the present invention may be widely varied. It is to be understood that the respective zones may comprise any suitable number and arrangement of units. The solvent may be recovered by any suitable means, such as by washing, distillation, and the like. The conditions and methods of operating, likewise, may be varied. Although the invention may be adapted for the treatment of oils, it is especially applicable to the treatment of oils boiling in the motor fuel and kerosene oil boiling ranges. If the solvent is utilized in contacting petroleum oils in the vapor phase, it is preferred that the product being treated comprise a petroleum oil having a final boiling point below about 450° F., preferably one having a final boiling point below about 350° F. The solvent preferably comprises a substance selected from the class consisting of liquid sulfur and liquid phosphorus. In general, it is preferred to use liquid sulfur. It is, however, to be understood that under certain conditions it may be desirable to employ other substances in conjunction with the liquid sulfur. Satisfactory substances of this character are, for example, high boiling aromatic constituents such as dibutyl and diethyl phthalate. In general, the solvent treating operation is carried out at a temperature below about 550° F., preferably at a temperature below about 350° F. and at a temperature above the melting point of the sulfur. The quantity of sulfur will vary depending upon the particular stock being treated. However, when contacting a vaporous feed oil it is preferred to use from 5 to 15 volumes of sulfur per liquid volume of feed oil. When contacting a liquid feed oil it is preferred to use from 3 to 10 volumes of sulfur per volume of feed oil. The pressure in a liquid-liquid operation is at least sufficient to keep the constituents in the liquid phase. The pressure in a liquid-vapor extraction operation will depend upon general operating conditions. It is preferred to use somewhat elevated pressures, generally in the range from about 25 to 200 pounds per square inch.

In order to illustrate the invention further, the following examples are given which should not be construed as limiting the same in any manner whatsoever:

Example 1

When treating a feed mixture consisting of 50% toluene and 50% normal heptane with 300% sulfur at 260° F., the solvent-free extract phase consisted of 76% toluene.

Example 2

Approximately 12 volumes of hydrocarbon consisting of 9 volumes of toluene and 3 volumes of normal heptane were mixed with 200 volumes of sulfur and heated to 260° F., under approximately 30 pounds per square inch pressure. The initial material distilled over consisted of hydrocarbon containing 64% normal heptane and was essentially sulfur free.

From the above it is apparent that the sulfur possesses a marked selectivity for aromatic type constituents as compared to paraffinic type constituents. We do not wish to limit this invention to the separation of hydrocarbon constituents but wish to cover the process for separating mixtures of organic compounds in general.

What we claim as new and wish to protect by Letters Patent is:

1. Process for the segregation of relatively more aromatic type constituents from relatively more paraffinic type constituents, which comprises contacting a feed oil with a solvent comprising liquid sulfur under conditions to dissolve the relatively more aromatic type constituents in the solvent and under conditions to form two phases, separating the respective phases and removing the sulfur therefrom.

2. Process as defined by claim 1, in which said feed oil comprises a petroleum oil and in which said operation is conducted at a temperature below about 550° F.

3. Process for the segregation of a hydrocarbon mixture into relatively more aromatic type constituents and into relatively more paraffinic type constituents, which comprises contacting said hydrocarbon mixture in the liquid phase with a solvent comprising liquid sulfur under conditions to form a raffinate phase and a solvent extract phase, separating the respective phases and removing the sulfur therefrom.

4. Process as defined by claim 3, in which said hydrocarbon mixture comprises a petroleum oil and in which said operation is conducted at a temperature below about 550° F.

5. Process for the segregation of a hydrocarbon mixture into relatively more aromatic type constituents and into relatively more paraffinic type constituents, which comprises contacting said hydrocarbon mixture in the vapor phase with a solvent comprising liquid sulfur under conditions to remove overhead paraffinic constituents and to form a solvent extract phase, separating the respective phases and recovering the sulfur.

6. Process as defined by claim 5, in which said hydrocarbon mixture comprises a petroleum oil and in which said operation is conducted at a temperature below about 550° F.

AUGUST HOLMES.
HENRY J. HIBSHMAN.